UNITED STATES PATENT OFFICE.

HERMANN ZERNING, OF HALENSEE, NEAR BERLIN, GERMANY, ASSIGNOR, BY MESNE ASSIGNMENTS, TO THE INTERNATIONAL "Z" ELECTRIC LAMP ASSOCIATION LIMITED, OF LONDON, ENGLAND, AN INCORPORATED COMPANY.

PROCESS OF PRODUCING HYDROGENOUS COMPOUNDS OF TUNGSTEN AND SIMILAR METALS.

1,019,581.

No Drawing.

Specification of Letters Patent. Patented Mar. 5, 1912.

Application filed March 3, 1906. Serial No. 304,073.

*To all whom it may concern:*

Be it known that I, HERMANN ZERNING, a subject of the King of Prussia, and resident of Halensee, near Berlin, in the Kingdom of Prussia, German Empire, have invented a new and useful Improvement in Processes of Producing Hydrogenous Compounds of Tungsten and Similar Metals, of which the following is a full, clear, and exact description.

My invention more particularly stated, relates to the preparation of compounds for use in the manufacture of filaments for incandescent lamps, and has for its object the production of these compounds in commercial quantities in a manner safer and more expeditious than heretofore.

It is well known that hydrogenous and nitrogenous compounds of the rare earths and of uranium have already been proposed for manufacturing filaments for electrical incandescent lamps. But the present invention consists in a method of manufacturing without danger, any desired quantities of hydrogenous and nitrogenous compounds of chromium, molybdenum, tungsten, uranium and other elements of the iron group, as will appear below.

If the hydrogenous or nitrogenous compounds of uranium, tungsten and the like are prepared according to the methods employed up to the present, that is, by means of a strongly reducing metal, as for example, magnesium or aluminium, explosions occur which may be very dangerous. For this reason, such compounds of uranium, tungsten and the like have been very seldom manufactured. The manufacture of these compounds in fact was so difficult and costly, that it was impossible to use them in the manufacture of filaments for electric incandescent lamps, although they were particularly suitable for the manufacture of such filaments, on account of their high melting point. My new method of manufacturing in large quantities without any danger, such hydrogenous and nitrogenous compounds, involves the use of a metal whose affinity for oxygen is less than that of the metals, magnesium, aluminium, potassium or sodium, which have heretofore been used as the reducing metals, and by this means I am enabled to avoid the above danger of explosions. Such an element, for example, is zinc in the form of powder.

The process may be carried out in similar manner as heretofore, the reduction being effected in a vessel to which heat is applied to increase the temperature of the mass while reduction takes place.

It has also been heretofore proposed to reduce tungsten to the metallic state by treating the oxid with finely powdered zinc, thereby producing an impure tungsten mixed with a small per cent. of tungsten oxid, and this mixture has been further treated with hydrochloric acid and zinc in order to further reduce the remaining tungsten oxid and thereby produce the metal pure. Such a process, however, does not produce my hydrogenous compound of tungsten, and the gray powder obtained by such process is unsuited for lamp filaments, while my product is eminently suited for that purpose. Further, my product is all a darker color than the gray product obtained by this process, and it also possesses a very much higher tensile strength when made into filaments.

A further method of safely manufacturing large quantities of the hydrogenous and nitrogenous compounds of uranium, consists in first reducing the uranium compounds employed by means of a metal such as zinc in powder according to the manner described above and then submitting the partly reduced compound to a second reduction by means of a metal such as magnesium or aluminium. This reduction in spite of the use of magnesium or aluminium can be carried out without any danger. The so reduced metals, now forming a hydrogenous or nitrogenous compound, can be freed from the admixture of metallic oxids as well as from metallic zinc and magnesium by treatment with acids. The mass is then washed and dried. These hydrogenous and nitrogenous compounds are obtained in a very suitable condition for manufacturing filaments for incandescent lamps. These compounds may be used separately or mixed with each other or for increasing the resistance of other substances as silicon, zirconium, boron or the like, or mixed with other metals.

For manufacturing the filaments, the above hydrogenous and nitrogenous compounds are mixed to a plastic mass with a suitable medium, such as tar or indiarubber, and are then pressed into filaments through suitable fittings in the known presses. It is not necessary to grind or mill the mass either before or after adding the binding medium, as these compounds prepared in the manner above described are obtained in the form of a fine flour or powder.

Having thus described my invention, what I claim as new and desire to secure by Letters Patent is:—

1. The method of producing nitrogenous and hydrogenous compounds of chromium, molybdenum, tungsten, and like elements for use in the manufacture of incandescent lamp filaments, which consists in reducing the metal in a dry way with the aid of finely divided zinc while forming said compounds in a heated vessel, substantially as described.

2. The method of producing hydrogenous compounds of tungsten, which consists in reducing the metal and forming said compounds in the dry way in a suitably heated vessel, with the aid of finely divided zinc; and purifying the product, substantially as described.

3. The method of producing hydrogenous compounds of a metal of the tungsten group, which consists in partly reducing the metal with the aid of finely divided zinc, and completely reducing the same with the aid of another metal while forming said compounds, substantially as described.

In witness whereof I have hereunto signed my name this 5th day of February 1906, in the presence of two subscribing witnesses.

HERMANN ZERNING.

Witnesses:
HENRY HASPER,
WOLDEMAR HAUPT.